July 24, 1928.

H. G. McCAFFREY 1,677,974

AIR CIRCULATING DEVICE FOR AIR DUCTS

Filed Oct. 27, 1927

INVENTOR.
H.G. McCAFFREY.

BY
ATTORNEYS

Patented July 24, 1928.

1,677,974

UNITED STATES PATENT OFFICE.

HENRY GRATTAN McCAFFREY, OF GALT, ONTARIO, CANADA.

AIR-CIRCULATING DEVICE FOR AIR DUCTS.

Application filed October 27, 1927. Serial No. 229,138.

My invention relates to improvements in air circulating devices for air ducts, and the object of the invention is to devise means which will automatically produce a normal circulation of air through the duct, such as is used for the supply of cold air to a furnace or for ventilating, or force air under pressure through such duct operated by the starting or stopping of the pressure creating means, and it consists essentially of the arrangement and construction of parts as hereinafter more particularly explained.

In the drawing like characters of reference indicate corresponding parts in each figure.

1 indicates a cold air duct of a furnace which is provided at one side with a casing 2 forming a receiving recess for the circulating fan hereinafter described.

Figure 1:
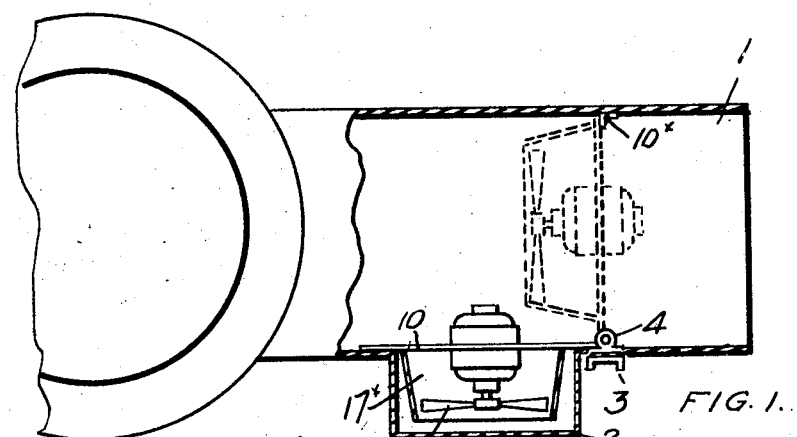
Fig. 1 is a sectional plan view of my device as applied to a cold air duct of a furnace.
Figure 2:
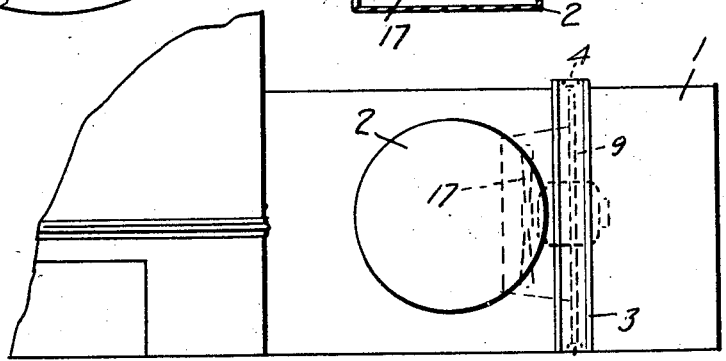
Fig. 2 is a side elevation of the parts shown in Fig. 1.
Figure 6:
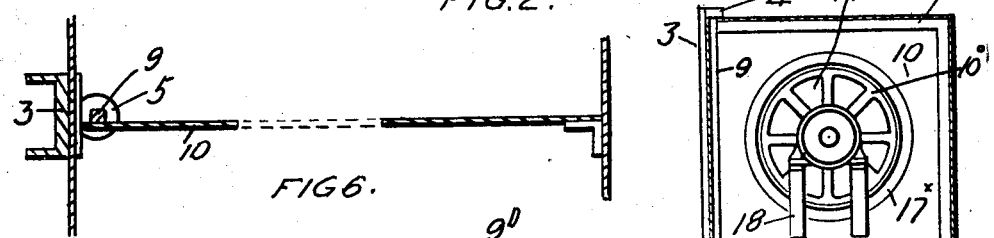
Fig. 6 is a sectional detail through an air duct showing the shutter in the closed position.
Figure 3:
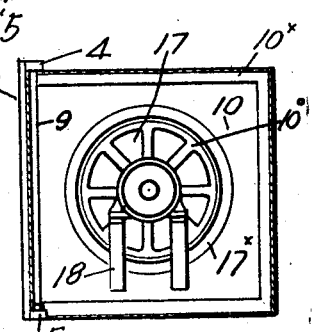
Fig. 3 is an end elevation showing the cold air duct and my circulating device in the pressure position.
Figure 4:
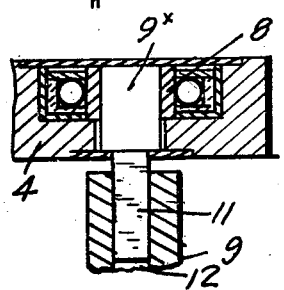
Fig. 4 is an enlarged sectional detail of the upper bearing of my damper member.
Figure 5:
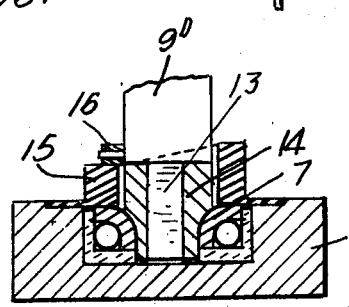
Fig. 5 is a similar sectional detail of the lower bearing.

3 is a channel bar which is secured to the side face of the duct 1 in proximity to the recess 2 and to which are secured upper and lower bearing members 4 and 5 which are in the form of eye brackets as indicated clearly in Figures 1 and 6.

The lower bracket 5 is provided with a thrust bearing 7 and the upper bracket with a radial bearing 8.

9 is a shaft to which the shutter 10 is secured. 10$^x$ is a frame secured within the cold air duct 1 and against which the edges of the shutter bear when it is forced to a position transversely of the air duct.

The shaft 9 may be in the form of a divided shaft 9$^x$ and 9° being the upper and lower members thereof operating within the bearings 8 and 7 respectively, and between which extend the main portion 9 of the shaft to which the shutter 10 is secured.

The portion 9$^x$ is provided with a reduced squared extension 11 fitting into a correspondingly formed longitudinal recess 12 in the upper end of the main portion 9 of the shaft. The lower end of the main portion 9 of the shaft is provided with a squared extension 13 fitting into an orifice in the lower portion 9° forming a bearing cone.

15 is a stationary annular member having an inclined upper end and 16 is a cam roller extending from the shaft portion 9 so as to bear upon the inclined end of the member 15.

It will thus be seen that when the shutter 10 secured to the shaft 9 is swung to the closed position the roller 16 will ride up upon the face of the cam 15 as the shutter is forced to the closed position. When the shutter is released the shaft member 9 will be carried by gravity longitudinally downward as the roller travels down the inclined face of the cam 15, automatically carrying the shutter 10 to the open position. Although I have described the above gravity means for returning the shutter to the normal position it will of course be understood that other gravity means may be employed or a counter weight provided to effect the described result.

When the shutter is used in a ventilating shaft the shutter is an imperforate shutter thereby permitting the circulation shutter to be open or closed as desired.

When it is used in connection with a cold air pipe of a furnace as shown in Figure 1, the shutter is provided with an orifice as indicated at 10° in which is located a motor for driving a fan 17 and which is mounted upon brackets 18 secured to the shutter, the fan being provided with a housing 17$^x$.

When the circuit of the motor has been closed and the fan revolves an air pressure is built up within the casing 2 between the closed end of the casing and the shutter 10. This pressure combined with the propeller action or screw action of the fan rotor or impeller acting in still air or slow moving air forces the fan out of the recess and swings it into the dotted position shown in Fig. 1 so as to circulate the air under pressure through the cold air duct 1. When the current is shut off from the motor and the fan ceases to revolve the pressure is thereby released and the screw action of the impeller ceases thus allowing the shutter to return by gravity to the normal or full line position shown in Fig. 1.

From this description it will be seen that I have devised a very simple device whereby a force fan may be swung to and from its operative position so as to either permit of the normal flow of air through the air duct or flow of air under pressure through such duct whenever desired.

What I claim as my invention is:—

1. The combination with an air duct, of a shutter hingedly mounted at one side of the duct so as to extend either longitudinally of the duct against the side thereof or transversely across the duct, a force fan carried by the shutter, and exerting air pressure, for automatically swinging the shutter to the transverse position and means for returning the shutter to the longitudinal position when the pressure is relieved.

2. The combination with an air duct, of a casing extending from the side of the air duct and forming a laterally extending internal recess, a shutter pivotally mounted within the duct and normally covering the recess, a fan mounted in the shutter so as to normally extend therefrom into the recess and adapted when revolved to force the shutter to a transverse position in relation to the duct, and means for automatically returning the shutter to its normal position when the motor is shut off.

3. The combination with an air duct, of a casing extending from the side of the air duct and forming a laterally extending internal recess, a shutter pivotally mounted within the duct, a fan mounted in the shutter and normally fitting within the recess and adapted to swing the shutter to a position transversely of the air duct, and means operated by gravity for returning the shutter to its normal position when the motor is shut off.

4. The combination with an air duct through which a current of air normally circulates, of air forcing means located in the duct, a movable support for the air forcing means, and means operated by the air forcing means ceasing to function for automatically moving the air forcing means out of the air current and means actuated by the functioning of the air forcing means for moving such air forcing means into the current.

HENRY GRATTAN McCAFFREY.